United States Patent [19]

Goel

[11] Patent Number: 4,681,926
[45] Date of Patent: Jul. 21, 1987

[54] RAPID SETTING POLYMERS FROM BICYCLIC AMIDE ACETALS/POLYOLS/POLYISOCYANATES

[75] Inventor: Anil B. Goel, Worthington, Ohio

[73] Assignee: Ashland Oil, Inc., Ashland, Ky.

[21] Appl. No.: 850,657

[22] Filed: Apr. 11, 1986

[51] Int. Cl.$^4$ .................. C08G 18/08; C08G 18/16
[52] U.S. Cl. ............................... 528/48; 528/49; 528/51; 528/52; 528/53; 528/55; 528/56; 528/58; 528/73; 528/74.5
[58] Field of Search .................. 528/73, 48, 49, 51, 528/52, 53, 55, 56, 58, 74.5

[56] References Cited

U.S. PATENT DOCUMENTS

| | | | |
|---|---|---|---|
| 3,489,723 | 1/1970 | Kraft | 260/77.5 |
| 3,726,827 | 4/1973 | Jones et al. | 260/31.8 |
| 3,755,212 | 8/1973 | Dunlap et al. | 260/2.5 AF |
| 3,897,410 | 7/1975 | Olstowski et al. | 260/18 TN |
| 4,562,240 | 12/1985 | Tufts | 528/73 |

Primary Examiner—Lucille M. Phynes
Attorney, Agent, or Firm—John F. Jones

[57] ABSTRACT

The process for preparing a polyurethane which sets rapidly and can be demolded within minutes by the reaction of a bicyclic amide acetal, a polyol and a polyisocyanate in the presence of a plasticizer such as dioctyl phathalate and a polyurethane catalyst such as stannous octoate is described.

12 Claims, No Drawings

RAPID SETTING POLYMERS FROM BICYCLIC AMIDE ACETALS/POLYOLS/POLYISOCYANATES

This invention relates to an improved process for the production of polymers which involves the interaction of bicyclic amide acetals, polyols and polyisocyanates in the presence of certain plasticizer additives such as carboxylic acid esters, organo phosphites, organo phosphates, alkylene carbonates, lactones and the like.

The reaction of certain bicyclic amide acetals with certain polyisocyanates to produce polymeric products at elevated temperatures has been reported in West German Patent Publication No. 3,235,933. The present invention is an improvement over use of polyols in the copolymerization reaction of bicyclic amide acetals with polyisocyanate disclosed in copending U.S. Pat. No. 4,562,240.

I have discovered that the use of certain plasticizers such as carboxylic acid esters, organo phosphites and organo phosphates, alkylene carbonates, lactones and the like more fully specified below results in rapid setting polymers with improved properties and that the polymerization process becomes more suitable particularly for bulk molding applications. The present invention relates to a process for preparing rapid setting copolymerization of bicyclic amide acetal, polyols and polyisocyanates using plasticizer additives and polyurethane catalyst at a temperature in the range of from about room temperature to about 200° C. and that the polymers resulting therefrom have improved physical properties such as impact strength, flexural yield strength and flexural modulus. Large bubble-free molded parts can be made by this process.

The bicyclic amide acetals useful in this invention are those having the Formula I

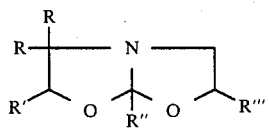

wherein R, R', and R''' independently represent hydrogen or an alkyl group having from 1 to 18 carbon atoms, and R''' also represents an alkyl ether having from 1 to 18 carbon atoms, an aryl ether or alkaryl ether group having from 6 to 20 carbon atoms. R'' represents an alkyl group having from 1 to 18 carbon atoms, an aryl group having from 6 to 12 carbon atoms, or an alkaryl group having from 7 to 20 carbon atoms.

The polyols useful in this invention include those having at least two hydroxyl groups per molecule and having equivalent weights falling in the range of from 30 to 5000. Specific polyols include butane diol, cyclohexane dimethanol, tripropylene glycol, amide diols, urethane diols, polyether polyols such as poly (tetramethylene ether) polyols, poly (propylene ether) polyols, polyester polyols, and the like.

Polyhydroxy polyethers are suitable and preferably those having at least 2 hydroxyl groups per molecule. Polyhydroxy polyethers can be prepared by polymerization of epoxides such as ethylene oxide, propylene oxide, butylene oxide, tetrahydrofuran, styrene oxide, or epichlorohydrin either on their own or by chemical addition to other materials. Suitable other materials include ethylene glycol, propylene glycol, trimethylol propane and 4,4'-dihydroxy diphenyl propane. Sucrose polyethers also may be used. Polybutadienes having hydroxyl groups as well as other known hydroxyl containing vinyl addition polymerized polymers can be used.

According to the present invention, hydroxyl containing polyesters, polythioethers, polyacetals, polycarbonates or polyesteramides of the types known for the formation of polyurethanes may also be used.

Particularly useful polyols for use in the present invention include ethylene glycol, propylene glycol, trimethylene glycol, triethylene glycol, pentaethylene glycol, polyethylene glycol, 1,4-butanediol, diethylene glycol, dipropylene glycol, 2,2-dimethyl-1,3-propanediol, hexamehylene glycol, 1,4-cyclohexane dimethanol, xylene alcohols, ethyl resorcinol, propyl resorcinol, 2,4-dimethyl resorcinol, 3,6-dimethyl-1,2,4-benzene triol, ethyl pyrogallol, 2,4-methyl-1,4-dihydroxy naphthalene, 3-methyl-1,4,5-naphthalene triol, dimethylol toluene, dimethylol xylene, bis-hydroxy ethyl or bis-hydroxy propyl ethers of resorcinol, catechol, or hydroquinones, 1,5-dihydroxy naphthalene, 4,4'-isopropylidene-bis-phenol, and the like.

The polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanates, trimethylene diisocyanate, dodecamethylene diisocyanate, hexamethylene diisocyanate, hexamethylene diisocyanate trimer, tetraethylene diisocyanate, pentamethylene diisocyanate, propylene-1,3-diisocyanate, 1,4-diisocyanato cyclohexane, cyclopentene-1,3-diisocyanate, p-phenylene diisocyanate, 1-methyl phenylene-1,4-diisocyanate, naphthalene-1,4-diisocyanate, toluene diisocyanate, diphenyl-4,4'-diisocyanate, benzene-1,2,4,-triisocyanate, xylene-1,4-diisocyanate, xylylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two which are more fully disclosed in U.S. Pat. Nos. 3,350,362 and 3,382,215. Polyisocyanates which are polymeric in nature including isocyanate prepolymers of all types are included in this invention.

The functionality of bicyclic amide acetal group towards the isocyanate group is at least two. In the process of this invention the weight ratio of bicyclic amide acetal:polyol should be in the range of from 95:5 to 1:99, respectively. The equivalent ratio of polyisocyanate:combined bicyclic amide acetal/polyol should be in the range of from 0.8:1 to 3:1, respectively. The amount of plasticizer which may be used in the process of the present invention can vary from about 2 to about 50% and preferably from about 5 to 40% by weight based on the weight of all ingredients. The amount of catalyst used in the process of the present invention may vary from about 0.01 to about 2% by weight of the other ingredients.

The catalyst useful in this invention include organometallic catalysts such as stannous carboxylate of dibutyltin laurate or a tertiary amine catalyst such as N,N', N''', tris (dimethyl(amino propyl) hexahydro triazine; 1,5-diaza-bicyclo (5.4.0) undec-5-ene, and other are described in U.S. Pat. No. 4,202,957. Suitable organometallic catalysts for urethane formation which may be used in the present invention include, for instance, organometallic compounds of tin, zinc, lead, mercury, cadmium, bismuth, cobalt, manganese, antimony, iron and the like such as metal salts of a carboxylic acid having from 2 to 20 carbon atoms including stannous octoate, dibutyltin dilaurate, dibutyl tin diacetate, ferric acetylacetonate, lead octoate, lead oleate, phenyl mercuric propionate, cobalt naphthenate, lead naphthenate, and mixtures thereof.

Suitable plasticizer materials for use in the present invention include carboxylic acid esters, organic phosphites, organic phosphates, alkylene carbonates, lactones, fatty acids or fatty oils, cyclic polyethers, aromatic compounds which are free from ester groups and partially hydrogenated aromatic compounds which are free from ester groups.

Suitable aromatic compounds which may be employed as the plasticizer in this invention include straight and branched chain aliphatic, alkoxy and halogen substituted benzenes, aromatic substituted benzene and aromatic ethers, propenyl benzene, propylbenzene, butylbenzene, ethyltoluene, butyltoluene, propyltoluene, diphenyl oxide, biphenyl, o-m-and-p-diethylbenzene, dodecylbenzene, octadecylbenzene, bromobenzene, 1-bromo-3-chlorobenzene, 1-bromo-4-fluorobenzene, 1-bromo-2-iodobenzene, 1-bromo-3-iodobenzene, 1-chloro-4-fluorobenzene, o-dibromobenzene, m-dibromobenzene, o-dichlorobenzene, 1-fluoro-4-iodobenzene, 4-bromo-o-xylene, alpha-bromo-m-xylene, 4-bromo-m-xylene, alpha-chloro-m-xylene, 4-ethyl-m-xylene, 5-ethyl-m-xylene, 2-bromo-p-xylene, alpha-chloro-p-xylene, 2-ethyl-p-xylene, o-bromotoluene, m-bromotoluene, o-, m-, and p-chlorotoluene, tertiary butylstyrene, alpha-bromostryene, beta-bromostyrene, alpha-chlorostyrene, beta-chlorostyrene, and mixtures thereof. Other suitable aromatic compounds include liquid multi-ring compounds having a boiling point aboue 150 degrees C. such as 1-chloronaphthalene, 1-bromonaphthalene, and mixtures thereof. Suitable partially hydrogenated multi-ring aromatic compounds include 1,4-dihydronaphthalene, 1,2,3,4-tetrahydronaphthalene, and mixtures thereof.

Suitable fatty acids and naturally occurring fatty oils which may be used as plasticizers in this invention include oleic acid, linoleic acid, linolenic acid, the fatty acids resulting from the hydrolysis of naturally occurring oils of animal and vegetable origin including linseed oil, castor oil, tung oil, fish oil, soya oil, and the like as well as acids produced as by-products from the conversion of wood pulp to paper by the sulfate process and mixtures thereof.

Also useful plasticizers are the naturally occuring fatty oils having boiling points above about 150 degrees C. such as linseed oil, castor oil, tung oil, fish oil, soya oil and the like.

Suitable organo phosphates and organo phosphites useful as plasticizers in this invention include tri-n-butyl phosphate, triethylphosphate, tricresylphosphate, tris-(beta-chloroethyl) phosphate, tris-(2,3-dibromopropyl) phosphate, tris-(2-chloroethyl) phosphite, tributyl phosphite, tricresyl phosphite, triethyl phosphite, diethyl isoamylphosphonate, diethyl ethylphosphonate, dimethyl methylphosphonate, diethyl methylphosphonate, diisobutyl isobutylphosphonate and bis(2-bromopropyl) -2-bromopropanephosphonate.

Suitable liquid organic carbonates which may be used as plasticizers in this invention include the acyclic and cyclic carbonates. Suitable liquid acyclic organic carbonates include bis(2-chloroethyl carbonate), di-n-butyl carbonate, butyldiglycol carbonate, cresyldiglycol carbonate, dibutyl carbonate, di-2-ethylhexyl carbonate, dimethallyl carbonate, dinonyl carbonate and the like. The organic acyclic carbonates may be prepared by procedures given in U.S. Pat. No. 2,687,425.

Suitable liquid cyclic organic carbonates include propylene carbonate, butylene carbonate, styrene carbonate, and mixtures thereof. Cyclic organic carbonates may be prepared in the manner described in Canadian Pat. No. 556,006.

Suitable cyclic polyether plasticizers include the cyclic tetramer of ethylene oxide, cyclic pentamer of propylene oxide, cyclic tetramer of propylene oxide, cyclic polyethers prepared from butylene oxide, epichlorohydrin, epibromohydrin, and the like.

Suitable cyclic sulfones which may be used as plasticizers in this invention include 3-methylsulfolane (3-methyltetrahydrothiophene-1,1-dioxide) and the like.

Suitable esters of carboxylic acids which may be used as plasticzers in this invention include those esters of mono-and polycarboxylic acids having from two to 20 carbon atoms including phthalic, adipic, acetoacetic, formic, acetic, abietic acids and the like wherein the ester portion is an alphatic group which contains from one to 20 carbon atoms such as methyl, ethyl, propyl, butyl, hexyl, cyclohexyl, octyl, decyl, dodecyl, eicosyl and the like. These acid esters may be prepared by condensing an acid of the described type with an unsaturated alphatic alcohol having from one to 20 carbon atoms.

Rigid, polymeric products can be prepared by the process of this invention in which the components are mixed rapidly. It is usually preferred to blend together thoroughly the bicyclic amide acetal, the polyol, the plasticizer and the catalyst and then finally to add the polyisocyanate to the mixture. Mechanical dispensing or combination mixing-dispensing devices can be employed in the process of this invention by using two or more streams of the individual components or mixtures of the components which are introduced into said device.

Other components including inert fillers such as sand, microballoons, glass fibers, asbestos, aluminum granules, silicon carbide powder and the like, coloring agents, such as pigments and dyes including chromic oxide, ferric oxide, mixtures thereof and the like may also be included in the compositions of the present invention without departing from the scope thereof.

The process of the present invention produces in a rapid fashion solid products which may be demolded (the articles produced therefrom may be removed from the mold) within a few minutes from the time they are formed.

The process and products of this invention are further illustrated in the following representative examples.

EXAMPLE 1

A degassed solution of a bicyclic amide acetal of Formula I in which R, R', and R''' are hydrogen and R'' is methyl (16 g), 17 g of dipropylene glycol, 15 g of dioctylphthalate and 0.02 g of stannous octoate was mixed rapidly with 76 g of degassed modified liquid methylene bis(phenyl isocyanate) (NCO equivalent weight of 144), and the clear homogeneous solution was poured into an 80 degree C. hot mold prepared from parallel glass plates coated on the inner surfaces with a silicone mold release agent and held apart by ⅛ inch spacers. Rapid polymerization occurred within a few seconds to give a white opaque solid polymer sheet. The sheet was postcured at 100 degrees C. for 45 minutes, followed by 140 degrees C. for 7 minutes. The resulting polymer was found to have a heat distortion temperature (ASTM D 648) of 104 degrees C., a notched izod impact strength (ASTM D 256) of 1.0 foot pound/inch of notch, a flexural yield strength (ASTM D 790) of 15,3418 psi and a flexural modulus of 348,985 psi.

EXAMPLE 2

This example is for comparison purposes and is otherwise outside the scope of this invention. The procedure of Example 1 was followed using the same reaction materials in exactly the same amounts except that no plasticizer (dioctylphthalate) was used. The final transparent polymer sheet was found to have a notched izod impact strength of 0.24 foot pound/inch of notch.

EXAMPLE 3

This experiment demonstrates that thick molded parts can be made using the reaction mixture of Example 1 in a rapid fashion without accompanying decomposition or bubble formation in the molded article. A solution of 16 g of the bicyclic amide acetal described in Example 1, 17 g of dipropylene glycol, 25 g of dioctylphthalate and 0.04 g of stannous octoate was mixed rapidly with 76 g of the polyisocyanate described in Example 1 in an open beaker of 250 ml capacity. A rapid polymerization occurred to give white, opaque solid polymer having a smooth surface within a few seconds without any observable decomposition.

EXAMPLE 4

This example is for comparison purposes only and is otherwise outside the scope of this invention. The procedure of Example 3 was followed using exactly the same reactants and procedures but excluding the plasticizer (dioctylphthalate). The polymerization took place with excessive heat generation. The exotherm was so high that the polymer mass cracked because of decomposition and gas evolution. The final polymer product contained a dark decomposed area and was not uniformly smooth on the surface.

EXAMPLE 5

The procedure of Example 1 was followed using 16 g of the bicyclic amide acetal, 17 g of dipropylene glycol, 15 g of dioctylazelate, 0.05 g of stannous octoate and 76 g of the polyisocyanate. The final polymer was opaque and white and was found to have a notched izod impact strength of 1.1 foot pounds/inch of notch, an unnotched izod impact strength of 11 foot pounds/inch, a heat distortion temperature of 107 degrees C., a flexural yield strength of 12,637 psi and a flexural modulus of 308,587 psi.

EXAMPLE 6

The procedure of Example 1 was followed using 16 g of the bicyclic amide acetal, 17 g of dipropylene glycol, 15 g of tributylphosphite, 0.04 g of stannous octoate and 76 g of the polyisocyanate. The final polymer sheet was found to have a notched izod impact strength of 1.2 foot pounds/inch of notch, an unnotched impact strength of 9.5 foot pounds/inch, a heat distortion temperature of 105 degrees C., a flexural yield strength of 9,557 psi and a flexural modulus of 275,571 psi.

EXAMPLE 7

The procedure of Example 1 was followed using 5 g of the bicyclic amide acetal, 29 g of dipropylene glycol, 15 g of dioctylphthalate, 0.06 g of stannous octoate and 76 g of the polyisocyanate. The final polymer sheet was found to have a notched izod impact strength of 0.7 foot pound/inch of notch, an unnotched izod impact strength of 7.0 foot pounds/inch, a heat distortion temperature of 92 degrees C., a flexural yield strength of 11,690 psi and a flexural modulus of 333,889 psi.

EXAMPLE 8

The procedure of Example 1 was followed using 10 g of the bicyclic amide acetal, 24 g of dipropylene glycol, 15 g of propylene carbonate, 0.04 g of stannous octoate and 76 g of the polyisocyanate. The final polymer sheet was found to have a notched izod impact strength of 0.5 foot pound/inch of notch, an unnotched izod impact strength of 7.1 foot pounds/inch, a flexural yield strength of 14,388 psi and a flexural modulus of 375,715 psi.

EXAMPLE 9

The procedure of Example 1 was followed using 10 g of the bicyclic amide acetal, 24 g of dipropylene glycol, 15 g of caprolactone, 0.04 g of stannous octoate and 76 g of the polyisocyanate. The final polymer sheet was found to have a notched izod impact strength of 0.6 foot pound/inch of notch, an unnotched izod impact strength of 8 foot pounds/inch, a flexural yield strength of 15,234 psi and a flexural modulus of 382,611 psi.

EXAMPLE 10

The procedure of Example 1 was followed using 5 g of the bicyclic amide acetal, 27 g of dipropylene glycol, 10 g of ethylene oxide capped poly (propylene oxide) triol (molecular weight of about 3500), 15 g of dioctylphthalate, 0.05 g of stannous octoate and 76 g of the polyisocyanate. The final polymer was found to have a notched izod impact strength of 1.44 foot pounds/inch of notch a heat distortion temperature of 103 degrees C., a flexural yield strength of 9,887 psi and a flexural modulus of 277,476 psi.

I claim:
1. The process for preparing a rapid setting, bubble free rigid polyurethane of improved properties comprising reacting a bicyclic amide acetal conforming to the formula

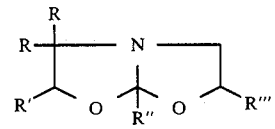

Wherein R, R' and R''' independently represent hydrogen or an alkyl group having from 1 to 18 carbon atoms, and R''' also represents an alkyl ether group having from 1 to 18 carbon atoms, an aryl ether or alkaryl ether group having from 6 to 20 carbon atoms, R'' represents an alkyl grup having from 1 to 18 carbon atoms, an aryl group having from 6 to 12 carbon atoms or an alkaryl group having from 7 to 20 carbon atoms, a poly isocyanate and a polyol in the presence of a plasticizer selected from the group consisting of carboxylic acid esters, organic phosphites, organic phosphates, alkylene carbonates, lactones, fatty oils, cyclic polyethers, aromatic compounds free from ester groups, partially hydrogenated aromatic compounds free from ester groups, and halogenated aliphatic compounds boiling above a temperature in the range of from about room temperature to about 200° C.

2. The process of claim 1 wherein the polyurethane catalyst is selected from the group consisting of organometallic catalysts and tertiary amine catalysts.

3. The process of claim 2 wherein the polyol is one having at least two hydroxyl groups per molecule and having an equivalent weight falling in the range of from 30 to 5000.

4. The process of claim 3 wherein the weight ratio of bicyclic amide acetal:polyol is in the range of from 95:5 to 1:99, respectively.

5. The process of claim 6 wherein the equivalent ratio of polyisocyanate:combined bicyclic amide acetal/polyol is in the range of from 0.8:1 to 3:1, respectively.

6. The process of claim 5 wherein the plasticizer is present in from 2 to about 50% by weight based on the weight of all ingredients.

7. The process of claim 6 wherein the catalyst is present in from 0.01% to 2% by weight of the other ingredients.

8. The process of claim 7 wherein the bicyclic amide acetal is one in which R, R' and R''' are hydrogen and R'' is methyl.

9. The process of claim 8 wherein the plasticizer is dioctylphthalate.

10. The process of claim 8 wherein the plasticizer is dioctyl azelate.

11. The process of claim 8 wherein the plasticizer is propylene carbonate.

12. The process of claim 8 wherein the plasticizer is caprolactone.

* * * * *